United States Patent [19]

Crasto et al.

[11] Patent Number: 5,738,741
[45] Date of Patent: Apr. 14, 1998

[54] PRE-FABRICATED VACUUM BAG AND VACUUM BAG PROCESS TO EXTERNALLY REINFORCE STRUCTURAL MEMBERS WITH ADVANCED COMPOSITES

[75] Inventors: Allan Stanislaus Crasto, Kettering; Ronald Dean Cornwell, Huber Heights; John Paul Mistretta, Beavercreek; Keith Bryan Bowman, Casstown; Brian Patrick Rice, Mason; James Andrew Lute, West Carrollton, all of Ohio

[73] Assignee: The University of Dayton, Dayton, Ohio

[21] Appl. No.: 621,632

[22] Filed: Mar. 26, 1996

[51] Int. Cl.⁶ .................. B29C 73/10; B29C 73/30; E02D 37/00
[52] U.S. Cl. .................. 156/71; 52/514; 156/94; 156/285; 156/382; 264/36
[58] Field of Search .................. 156/71, 94, 98, 156/285, 386, 382; 52/514; 264/36

[56] References Cited

U.S. PATENT DOCUMENTS

| | | | |
|---|---|---|---|
| 4,554,036 | 11/1985 | Newsom | 156/382 |
| 4,622,091 | 11/1986 | Letterman | 156/286 |
| 4,652,319 | 3/1987 | Hammond | 156/94 |
| 4,793,879 | 12/1988 | Mimbs | 156/94 |
| 4,869,770 | 9/1989 | Christensen | 156/286 |
| 5,043,033 | 8/1991 | Fyfe | 156/71 |
| 5,145,541 | 9/1992 | Baron | 156/98 |
| 5,242,652 | 9/1993 | Savigny | 264/510 |
| 5,322,665 | 6/1994 | Bernardon | 156/285 |
| 5,505,030 | 4/1996 | Michalcewiz | 52/514 |
| 5,607,527 | 3/1997 | Isley | 156/94 |

OTHER PUBLICATIONS

Chajes et al., *Restructuring: America and Beyond*, American Society of Civil Engineers, Boston, Massachusetts, Apr. 2–5, 1995, pp. 1450–1453.

Klaiber et al., *Practical Solutions for Bridge Strengthening & Rehabilitation*, Des Moines, Iowa, Apr. 5–6, 1993, pp. 265–274.

*Primary Examiner*—Daniel Stemmer
*Attorney, Agent, or Firm*—Killworth, Gottman, Hagan & Schaeff, L.L.P.

[57] ABSTRACT

A structural member is reinforced by applying an adhesive material between a reinforcement surface of the structural member and an adhesion surface of a support plate, positioning a vacuum assembly adjacent to an exposed surface of said support plate so as to create an inner space between an exterior surface of said vacuum assembly and said reinforcement surface, and creating a partial vacuum in said inner space so as to force said vacuum assembly and said plate towards said reinforcement surface. A prefabricated vacuum assembly is a vacuum assembly comprising a flexible porous film, a flexible non-porous film, and a flexible sheet of breather material positioned between said porous film and said non-porous film.

15 Claims, 2 Drawing Sheets

PRE-FABRICATED VACUUM BAG AND VACUUM BAG PROCESS TO EXTERNALLY REINFORCE STRUCTURAL MEMBERS WITH ADVANCED COMPOSITES

GOVERNMENT RIGHTS

The Government has rights in this invention pursuant to Air Force Contract No. F33615-91-C-5618.

BACKGROUND OF THE INVENTION

The present invention relates to reinforcement of structural members. More particularly, it relates to a vacuum bag process to externally reinforce concrete structural members with advanced composites and to a prefabricated vacuum bag used for that purpose.

Concrete structural members are widely used in the construction of bridges and buildings. For example, many of the concrete bridges connected with the interstate highway system are close to 40 years old and, since bridge deck life commonly averages 35 years, are due for major rehabilitation or replacement.

A conventional method of repairing concrete bridges involves strengthening or stiffening weak or damaged concrete portions by bonding steel plates thereto with an epoxy. This method has the potential to allow for repair of a concrete bridge without major interruption of the use of the bridge. However, corrosion at the epoxy/steel interface leads to a reduced bond strength and an increased likelihood of structural failure. Additionally, the steel plates are cumbersome, heavy, and generally difficult to handle.

The use of light weight corrosion resistant composite plates as a means of rehabilitating cracked beams in box beam bridges has been studied by Chajes et al., "Rehabilitation of Cracked Adjacent Concrete Box Beam Bridges" 13$^{th}$ Structures Congress, American Society of Civil Engineers (Boston, Mass. 1995). However, Chajes et al. do not suggest any method by which the composite plates can be effectively bonded to the concrete beams in the field, have observed delamination and peel-type failures between the composite plate and the concrete, and have noted that thorough studies are needed to discover an appropriate method of bonding the composite plates to a structure under field conditions.

Accordingly, there is a need for a method of effectively bonding composite plates to a structure to reduce the likelihood of delamination and peel-type failure. Further, there is a need for a means by which a composite plate can be successfully adhered to a structure in an in-situ environment and a non-intrusive manner.

SUMMARY OF THE INVENTION

This need is met by the present invention wherein structural members are externally reinforced with reinforcing material cured against or adhered to the structural member through the use of a prefabricated vacuum bag assembly.

In accordance with one embodiment of the present invention, a method of reinforcing structural members is provided comprising the steps of: providing a reinforcement material to be bonded to a reinforcement surface of a structural member, positioning a vacuum assembly adjacent to an exposed surface of the reinforcement material so as to create an inner space between an exterior surface of the vacuum assembly and the reinforcement surface, and creating a partial vacuum in the inner space so as to force the vacuum assembly and the reinforcement material towards the reinforcement surface.

The positioning step preferably includes sealing a peripheral portion of the vacuum assembly against the structural member, enveloping the reinforcement material with the vacuum assembly, and/or securing the vacuum assembly to the structural member along a continuous path surrounding a periphery of the reinforcement material. The inner space is preferably occupied by the reinforcement material, a porous release film, and a breather element.

The vacuum assembly may comprise a porous film of flexible material, a non-porous film of flexible material, and a sheet of flexible breather material positioned between the porous film and the non-porous film. The porous film may comprise an adhesive release film. The sheet of breather material is preferably adhered to the porous film and the flexible non-porous film. The flexible non-porous film may comprise a plastic film selected from the group consisting of a plastic film including one vacuum port, a plastic film including a plurality of vacuum ports, a plastic film including two symmetrically positioned vacuum ports, and a plastic film including a plurality of symmetrically positioned vacuum ports. The flexible non-porous film may include a peripheral portion defined by a portion of the flexible non-porous film extending beyond the periphery of the sheet of breather material and the peripheral portion may include a continuous sealant. The force is preferably substantially equivalent to a pressure of about 8–12 psi applied uniformly over a predetermined area.

The providing step preferably includes curing the reinforcement material between porous curing release plies to impart a rough surface texture to the reinforcement material.

The method of reinforcing structural members may further comprise the step of mechanically abrading the reinforcement surface, and/or treating the reinforcement surface with an acetone rinse. The method of reinforcing structural members may also further comprise the step of applying an adhesive material between the reinforcement surface of the structural member and an adhesion surface of the reinforcement material. The reinforcement material may comprise a support plate.

In accordance with another embodiment of the present invention, a vacuum enclosure is provided comprising: a porous film of flexible material, a non-porous film of flexible material, and a sheet of flexible breather material positioned between the flexible porous film and the flexible non-porous film. Preferably, the porous film comprises an adhesive release film. The sheet of breather material may be adhered to the porous film and to the non-porous film. The non-porous film preferably comprises a plastic film selected from the group consisting of a plastic film including one vacuum port, a plastic film including a plurality of vacuum ports, a plastic film including two symmetrically positioned vacuum ports, and a plastic film including a plurality of symmetrically positioned vacuum ports. The non-porous film may include a peripheral portion defined by a portion of the non-porous film extending beyond a periphery of the sheet of breather material. The non-porous film preferably has width and length dimensions substantially greater than the width and length dimensions of the porous film and the sheet of breather material.

In accordance with yet another embodiment of the present invention a process of forming a vacuum assembly is provided comprising the steps of: providing a flexible film of porous material, providing a flexible sheet of breather material, providing a flexible film of non-porous material, adhering a first major surface of the sheet of breather material to the porous film, and adhering a second major surface of the sheet of breather material to the non-porous film. The process of forming a vacuum assembly may further comprise the step of fusing first and second longitudinal edges of the porous film and the non-porous film.

Accordingly, it is an object of the present invention to provide a means by which composite plates can be conveniently, efficiently, and effectively bonded to a structure in need of reinforcement.

DETAILED DESCRIPTION OF THE INVENTION

Figure 1:
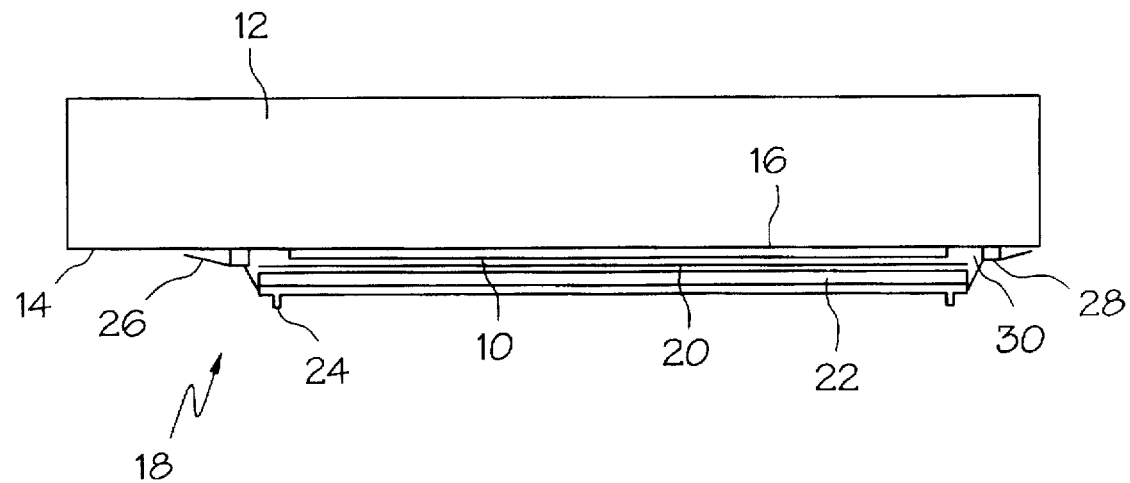
FIGS. 1 and 2 are side and bottom views, respectively, illustrating the composite plate bonding process according to the present invention.
Figure 2:
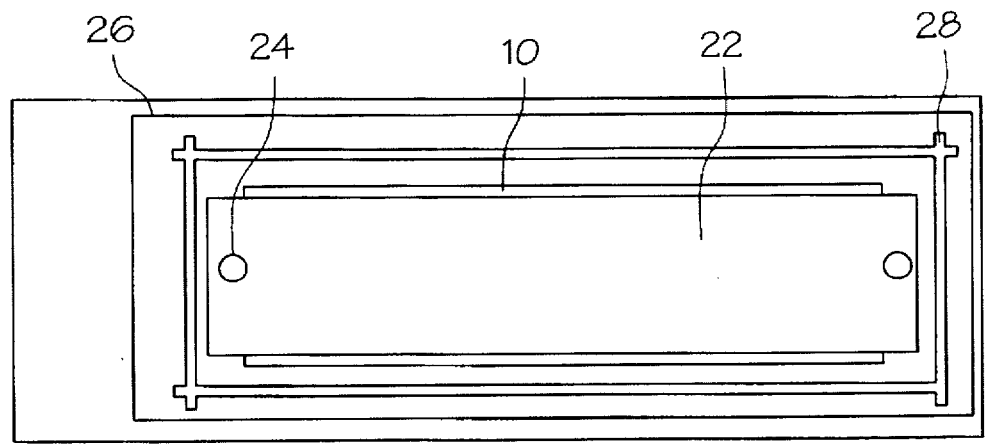

A method of reinforcing structural members according to the present invention will be described with reference to FIGS. 1 and 2, where like structural elements are indicated with like reference numerals. The structure illustrated in FIGS. 1 and 2 comprises: a composite support plate 10; a concrete structural beam 12 in need of reinforcement or repair and having a reinforcement surface 14, i.e. a beam surface to which the support plate 10 is to be bonded; a layer of adhesive material 16 positioned between the reinforcement surface 14 and an adhesion surface of the support plate 10; a vacuum bag assembly 18 including a porous adhesive release film 20, a breather element 22, vacuum ports 24, and a flexible exterior non-porous plastic film 26; and, a peripheral sealant 28.

The composite support plate 10 is used to reinforce the concrete beam 12 by bonding the support plate 10 to the reinforcement surface 14 of the beam 12 according to the methodology described below. Preferably, prior to bonding, the reinforcement surface 14 is prepared for bonding by removing loose concrete with a wire brush.

The support plate 10 comprises a carbon fiber reinforced plastic (CFRP) plate. One such suitable plate is a graphite/epoxy composite system available from Hercules, Inc., as product number AS4C/1919, and having a ply thickness of 0.007 inches (0.18 mm). The composite plate 10 comprises multiple plies fabricated with 0/0, 0/0/0/0/0, or 0/90/0 lay-ups. For example, the 0/90/0 plate comprises a first 0.007 inch (0.18 mm) ply having fibers substantially aligned parallel to the longitudinal direction of the support plate 10, a second ply having fibers substantially aligned in a width direction of the support plate 10, i.e. oriented 90° from the direction of the first ply, and a third ply having fibers substantially aligned parallel to the fibers in the first layer. The 0/0/0/0/0 plate comprises five 0.007 inch (0.18 mm) thick plies each having fibers substantially aligned parallel to the longitudinal direction of the support plate 10.

Preferably, the fiber content of the CFRP plate is approximately 60% of the plate volume; however, it is contemplated by the present invention that a variety of fiber volumes and a variety of composite materials may be utilized in the support plate 10 without departing from the scope of the present invention.

It is contemplated by the present invention that an uncured reinforcement material, e.g., an uncured resin, or a non-rigid reinforcement material, e.g., an fibrous matt, or a combination of both, may be substituted for the support plate 10 as long as a means is provided whereby the reinforcement material can become cured or rigid after adhesion to the reinforcement surface 14. For example, where a fibrous matt is provided as the reinforcement material the layer of adhesive material 16 is selected such that it will commingle with the fibrous matt and add rigidity to the fibrous matt upon curing of the adhesive. Alternatively, the layer of adhesive material itself could be selected so as to function as the reinforcement material after cure.

To achieve an improved bond between the adhesion surface of the support plate 10 and the reinforcement surface 14, the plate 10 is cured between porous adhesive curing release plies to impart a rough surface texture to the support plate 10. Additionally, the surface of the support plate 10 is mechanically abraded with 240 grit sand paper, and/or rinsed with an acetone rinse.

To facilitate bonding, an adhesive 16 is applied to the reinforcement surface 14 and overlaid with the support plate 10. Two epoxy adhesives which cure above approximately 50° F. (10° C.) are EA9460 from Dexter Hysol, Inc., and Sikadur 31 from Sika Corp., are suitable for use with the present invention. It is contemplated by the present invention that a variety of adhesives 16 may be utilized without departing from the scope of the present invention, including adhesives which cure at other than ambient conditions.

The non-porous plastic film 26 forms a vacuum membrane and is sealed against, and adhered to, the concrete beam 12 around a periphery of the support plate 10 with the peripheral sealant 28 such that the non-porous plastic film 26 encloses an inner space 30 between the flexible exterior non-porous plastic film 26, and the reinforcement surface 14 of the concrete beam 12. The entire support plate 10 is enveloped by the vacuum assembly 18. The peripheral sealant 28 permits adhesion of the non-porous plastic film 26 to, and clean removal from, the concrete beam 12. A suitable peripheral sealant is a polysiloxane based adhesive tape, e.g., the GS B55 sealant tape available from Airtech Int'l. Inc., Carson, Calif. It is contemplated by the present invention that the non-porous plastic film 26 may be sealed against the concrete beam 12 around a periphery of the support plate 10 by any means whereby the vacuum assembly 18 forms a seal against the concrete beam. For example, the vacuum assembly 18 may be forcibly, uniformly, and continuously urged against the concrete beam 12. When sealed against the concrete beam, the non-porous plastic film 26 is sufficiently non-porous so as to enable the maintenance of a significant atmospheric pressure difference between the inner space 30 and the ambient, as described below.

The vacuum assembly 18 includes the porous release film 20, the breather element 22, the vacuum ports 24, and the flexible exterior non-porous plastic film 26. The vacuum ports 24 are created in the plastic film 26 and couple the inner space 30 to vacuum pumps (not shown). In the embodiment shown in FIGS. 1 and 2, two vacuum ports 24 are symmetrically positioned with respect to the support plate 10 to ensure uniform distribution of a compressive bonding force, described below. It is contemplated by the present invention that a single vacuum port, a centrally located vacuum port, a plurality of vacuum ports, or a plurality of symmetrically positioned vacuum ports 24 may be utilized without departing from the scope of the present invention. Further, it is contemplated by the present invention that vacuum ports may be provided in the peripheral sealant 28, the structure to be reinforced, or in any location as long as a vacuum pump is in communication with the inner space 30.

The porous release film 20 act as a clean release barrier between the vacuum assembly 18 and stray adhesive material 16 to prevent adhesion of the vacuum assembly 18 to any adhesive 16 not confined between the support plate 10 and the concrete beam 12 and to the support plate 10 itself. Preferably, the porous release film 20 comprises a halogenated material (Teflon®) and extends at least as far as the breather element 22 and substantially farther than the support plate 10. A perforated release film available from Airtech Int'l. Inc., Carson, Calif., as item number A4000RP, is an example of a suitable material for the porous adhesive release film 20. Air Weave N7, available from Airtech Int'l. Inc., is a 0.25 inch (0.1 mm) thick non-woven polyester fiber matt suitable for use as the breather element 22. Wrightlon 8400, available from Airtech Int'l. Inc., is a nylon bagging film suitable for use as the flexible non-porous plastic film 26.

With the adhesive 16 applied to the reinforcement surface 14 and overlaid with the support plate 10, and with the non-porous plastic film 26 sealed against, and adhered to, the concrete beam 12, as described above, a pressure difference is created between the inner space 30 and the ambient by partially evacuating the inner space 30 through the vacuum ports 24. The porous release film 20 and the breather element 22 permit gaseous/volatile matter present in the inner space 30 to pass through the vacuum ports 24. A compressive bonding force results from the pressure difference and is exerted by the plastic film 26 in the general direction of the reinforcement surface 14. The breather element 22 has dimensions large enough to cover most of the support plate 10 and acts to distribute the compressive bonding force evenly across the support plate 10. It is contemplated by the present invention that the breather element 22 may cover all of the support plate 10 or extend beyond the boundaries of the support plate 10.

The inner space is evacuated to create a force substantially equivalent to a pressure of about 8–12 psi (55–85 kPa) applied uniformly over a the support plate area. The partial vacuum is preferably maintained until the adhesive has cured to its full strength. After the appropriate vacuum period has passed, the temporary nature of the peripheral sealant 28 permits removal of the vacuum assembly 18 from the concrete beam 12. The support plate 10 remains in contact with the reinforcement surface 14 after the vacuum assembly 18 is removed from the concrete beam 12 and functions to add strength and rigidity to the concrete beam 12. It is contemplated by the present invention that the vacuum assembly 18 may or may not be removed from the concrete beam 12 and that the peripheral sealant 28 may be a permanent adhesive if clean removal of the vacuum assembly 18 is not desired. Further, because of practical limits in practicing the present invention, it is contemplated by the present invention that the vacuum may merely be maintained for a portion of the adhesive cure time, e.g., 6 or 24 hours where the substantial full strength cure time of the adhesive is 72 hours. Finally, depending upon the type of adhesive used, the strength of the non-porous plastic film 26, the strength of the peripheral sealant, and the power of the vacuum pumps, it is contemplated by the present invention that the degree of evacuation in the inner space 30 may be altered to create a variety of pressures applied uniformly over the support plate area and to ensure adequate bonding between the support plate 10 and the reinforcement surface 14.

Figure 3:
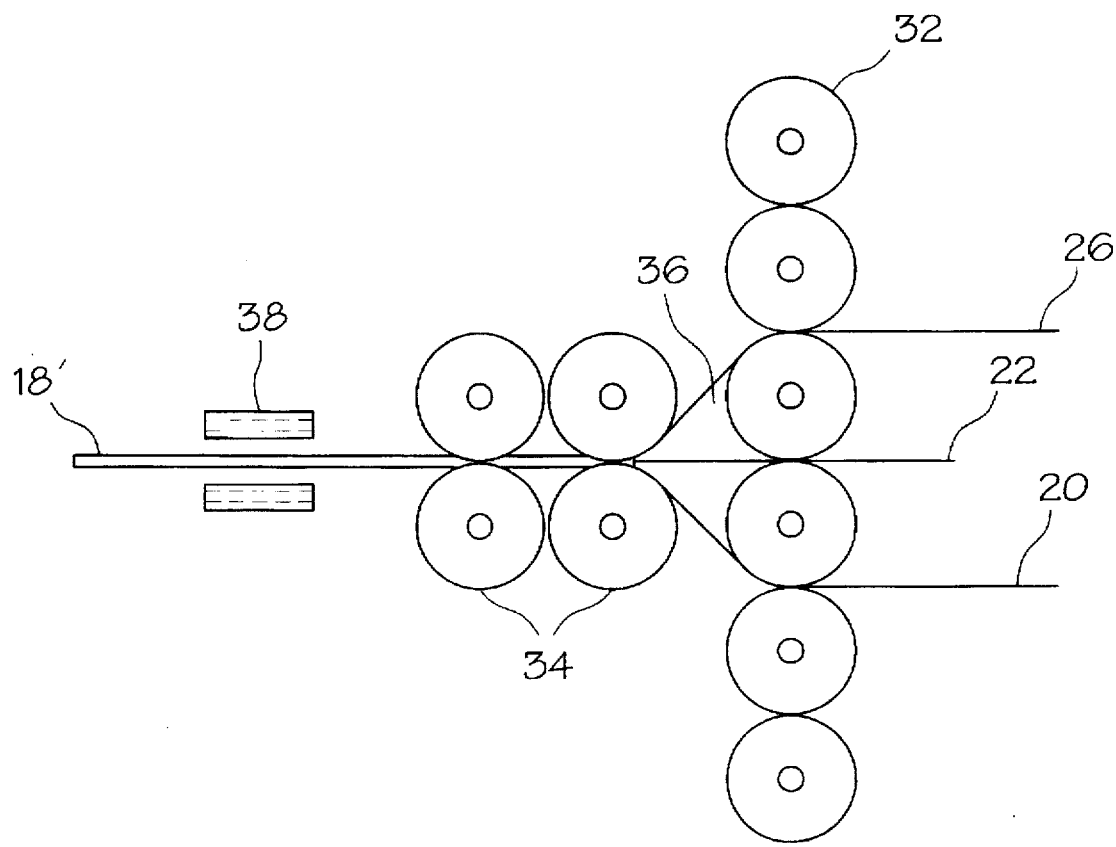
FIG. 3 illustrates the process for forming a vacuum enclosure used in the bonding process of the present invention.

The structure and assembly of a prefabricated vacuum bag or vacuum assembly 18' will be further described with reference to FIG. 3, where like elements are referenced with like reference numerals. To form the prefabricated vacuum assembly 18', the porous release film 20, the breather element 22, and the flexible non-porous plastic film 26 are initially drawn separately through a set of feed rollers 32. The length and width dimensions of the breather element 22 are less than the length and width dimensions of the porous release film 20 and the non-porous plastic film 26 such that, when the layers 20, 22, and 26 are joined in the manner described below, the breather material is not present along an entire outer periphery of the prefabricated vacuum assembly 18'. Similarly, the length and width dimensions of the porous release film 20 are less than the length and width dimensions of the non-porous plastic film 26 such that, when the layers 20, 22, and 26 are joined as described below, the porous release film 20 is not present along an entire outer periphery of the prefabricated vacuum assembly 18'. Preferably, at least approximately 2–4 inches of the outer periphery of the prefabricated vacuum assembly 18' is not occupied by the breather material 22 or the porous release film 20.

The breather element 22 is secured to the porous release film 20 and the flexible non-porous plastic film 26 by applying an adhesive to first and second major sides of the breather element in an adhesive application area 36. The adhesive may be applied through spray application, as a bead, or otherwise, as long as the breather element 22 is prevented from shifting within the prefabricated vacuum assembly 18'. The hot rollers 34 fuse first and second longitudinal edges of the porous release film 20 and the non-porous plastic film 26 by compressing an adhesive bead applied between the release film 20 and the non-porous plastic film 26. It is contemplated by the present invention that the adhesive bead need not be utilized if the temperature of the hot rollers is high enough to cause the release film 20 to adhere to the non-porous plastic film 26. It is also contemplated by the present invention that the longitudinal edges of the porous release film 20 and the non-porous plastic film 26 need not be fused at all if the bond created by the adhesive applied to the first and second major sides of the breather element is sufficiently strong to secure the porous release film 20 and the breather element 22 to the non-porous plastic film 26.

A sheet cutter 38 is provided for cutting the prefabricated vacuum assembly 18' to a predetermined length. Alternatively, a perforator is positioned in place of the cutter 38 so as to permit formation of a continuous length of detachable prefabricated vacuum assemblies. The prefabricated vacuum assembly 18', constructed as described above, is designed to be securely sealed along its outer periphery to the concrete beam 12 to facilitate evacuation of the inner space 30 and bonding of the support plate 10 to the reinforcement surface 14. The vacuum ports 24 are created by punching holes in the flexible non-porous plastic film 26. It is contemplated by the present invention that holes may be punched in the non-porous plastic film 26 manually, following production of the prefabricated vacuum assembly 18', or automatically, at any point in the production process. It is also contemplated by the present invention that a variety of shapes and sizes of vacuum assemblies may be produced and used according to the present invention.

It is contemplated by the present invention that the prefabricated vacuum bag 10' may be used to reinforce structural members, as described above, and may also be used in any process requiring constrictive compression of a single material or a plurality of materials. For example, the prefabricated vacuum bag may be used in element-to-element bonding processes, composite curing processes, single element curing processes, tool forming processes, and adhesive curing processes.

Having described the invention in detail and by reference to preferred embodiments thereof, it will be apparent that modifications and variations are possible without departing from the scope of the invention defined in the appended claims.

What is claimed is:

1. A method of reinforcing structural members comprising the steps of:

positioning a reinforcement material adjacent to a reinforcement surface of a structural member, wherein, prior to said positioning step, said reinforcement material is cured between curing release plies, at least one of which is porous, to impart a rough surface texture to at least one surface of said reinforcement material;

positioning a vacuum assembly adjacent to an exposed surface of said reinforcement material so as to create an inner space between said vacuum assembly and said reinforcement surface of said structural member; and creating a partial vacuum in said inner space so as to force said vacuum assembly and said reinforcement material towards said reinforcement surface.

2. A method of reinforcing structural members as claimed in claim 1, wherein said positioning step includes sealing a peripheral portion of said vacuum assembly against said structural member.

3. A method of reinforcing structural members as claimed in claim 1, wherein said positioning step includes enveloping said reinforcement material with said vacuum assembly.

4. A method of reinforcing structural members as claimed in claim 1, wherein said positioning step includes securing said vacuum assembly to said structural member along a continuous path surrounding a periphery of said reinforcement material.

5. A method of reinforcing structural members as claimed in claim 1, wherein said inner space is occupied by said reinforcement material, a porous release film, and a breather element.

6. A method of reinforcing structural members as claimed in claim 1, wherein said vacuum assembly comprises a porous film of flexible material, a non-porous film of flexible material, and a sheet of flexible breather material positioned between said porous film and said non-porous film.

7. A method of reinforcing structural members as claimed in claim 6, wherein said porous film comprises an adhesive release film.

8. A method of reinforcing structural members as claimed in claim 6, wherein said sheet of breather material is adhered to said porous film and said flexible non-porous film.

9. A method of reinforcing structural members as claimed in claim 6, wherein said flexible non-porous film comprises a plastic film selected from the group consisting of a plastic film including one vacuum port, a plastic film including a plurality of vacuum ports, a plastic film including two symmetrically positioned vacuum ports, and a plastic film including a plurality of symmetrically positioned vacuum ports.

10. A method of reinforcing structural members as claimed in claim 6, wherein said flexible non-porous film includes a peripheral portion defined by a portion of said flexible non-porous film extending beyond the periphery of said sheet of breather material and wherein said peripheral portion includes a continuous sealant.

11. A method of reinforcing structural members as claimed in claim 1, wherein said force is substantially equivalent to a pressure of about 8–12 psi applied uniformly over a predetermined area.

12. A method of reinforcing structural members as claimed in claim 1, further comprising the step of mechanically abrading the reinforcement surface.

13. A method of reinforcing structural members as claimed in claim 1, further comprising the step of treating the reinforcement surface with an acetone rinse.

14. A method of reinforcing structural members as claimed in claim 1, further comprising the step of applying an adhesive material between the reinforcement surface of the structural member and an adhesion surface of said reinforcement material.

15. A method of reinforcing structural members as claimed in claim 1 wherein said reinforcement material comprises a support plate.

* * * * *